(12) United States Patent
Kadiri et al.

(10) Patent No.: US 12,262,251 B2
(45) Date of Patent: Mar. 25, 2025

(54) APPARATUS AND METHODS FOR MAINTAINING BROADCAST SERVICE WIRELESS COMMUNICATIONS

(71) Applicant: QUALCOMM Incorporated, San Diego, CA (US)

(72) Inventors: Prasad Reddy Kadiri, San Diego, CA (US); Xipeng Zhu, San Diego, CA (US); Umesh Phuyal, San Diego, CA (US); Le Liu, San Jose, CA (US); Kazuki Takeda, Tokyo (JP); Alberto Rico Alvarino, San Diego, CA (US); Miguel Griot, La Jolla, CA (US); Haris Zisimopoulos, London (GB)

(73) Assignee: QUALCOMM Incorporated, San Diego, CA (US)

( * ) Notice: Subject to any disclaimer, the term of this patent is extended or adjusted under 35 U.S.C. 154(b) by 400 days.

(21) Appl. No.: 17/788,629

(22) PCT Filed: Jan. 7, 2021

(86) PCT No.: PCT/US2021/012496
§ 371 (c)(1),
(2) Date: Jun. 23, 2022

(87) PCT Pub. No.: WO2021/150378
PCT Pub. Date: Jul. 29, 2021

(65) Prior Publication Data
US 2023/0029146 A1    Jan. 26, 2023

(30) Foreign Application Priority Data
Jan. 24, 2020    (GR) .............................. 20200100031

(51) Int. Cl.
*H04W 36/00*    (2009.01)

(52) U.S. Cl.
CPC ............... *H04W 36/0007* (2018.08); *H04W 36/0016* (2013.01); *H04W 36/0009* (2018.08)

(58) Field of Classification Search
CPC ......... H04W 36/0007; H04W 36/0016; H04W 36/0009
See application file for complete search history.

(56) References Cited

U.S. PATENT DOCUMENTS 10,277,416 B2    4/2019    Zhu
2011/0305183 A1*    12/2011    Hsu ................... H04W 36/0055
                                                                    370/312

(Continued)

FOREIGN PATENT DOCUMENTS

CN    106412848 A    2/2017

OTHER PUBLICATIONS

Ericsson: "eMBMS on Scell", 3GPP Draft, 3GPP TSG RAN WG1 Meeting #75, R1-135773 6.1 EMBMS on Scell, RAN WG1, No. San Francisco, SA, Nov. 11, 2013-Nov. 15, 2013, Nov. 13, 2013 (Nov. 13, 2013), XP050735418, 2 Pages, p. 1-p. 2.

(Continued)

*Primary Examiner* — Kiet Tang
(74) *Attorney, Agent, or Firm* — Arent Fox, LLP

(57) ABSTRACT

Aspects described herein relate to communicating with one or more cells for receiving a broadcast service, and providing broadcast service continuity in device mobility scenarios. In some aspects, a user equipment (UE) can transmit a broadcast service interest indication to a serving cell to facilitate receiving the broadcast service during mobility to provide the broadcast service continuity.

30 Claims, 6 Drawing Sheets

(56) References Cited

U.S. PATENT DOCUMENTS

2013/0039250 A1    2/2013  Hsu
2018/0220336 A1*  8/2018  Hong ................ H04W 36/0016
2021/0022049 A1*  1/2021  Ke .................... H04W 36/0066

OTHER PUBLICATIONS

International Search Report and Written Opinion—PCT/US2021/012496—ISA/EPO—Apr. 26, 2021.

LG Electronics Inc: "[77#30]—LTE: MBMS Interest Indication", 3GPP Draft, 3GPP TSG-RAN WG2 #77bis, R2-121385 77#30—LTE MBMS Interest Indication, RAN WG2, No. Jeju, South Korea, Mar. 26, 2012-Mar. 30, 2012, Mar. 21, 2012 (Mar. 21, 2012), XP050606504, 10 Pages, p. 1-p. 10.

Qualcomm Incorporated: "Discussion on RRM Requirement for FeMBMS", BGPP Draft, 3GPP TSG-RAN WG4 #83, R4-1705745, Discussion on RRM Requirement for FeMBMS, 3rd Generation Partnership Project (3GPP), RAN WG4, No. Hangzhou, China, May 15, 2017-May 19, 2017, May 14, 2017, XP051277789, 5 Pages, p. 1-p. 5.

\* cited by examiner

APPARATUS AND METHODS FOR MAINTAINING BROADCAST SERVICE WIRELESS COMMUNICATIONS

CROSS REFERENCE TO RELATED APPLICATION(S)

The present application is a 35 U.S.C. § 371 National Phase of International Patent Application No. PCT/US2021/012496, entitled "APPARATUS AND METHODS FOR MAINTAINING BROADCAST SERVICE WIRELESS COMMUNICATIONS" filed Jan. 7, 2021, which claims priority to Greek Patent Application No. 20200100031, entitled "TECHNIQUES FOR MAINTAINING MULTICAST BROADCAST SERVICE WIRELESS COMMUNICATIONS" filed Jan. 24, 2020, both of which are assigned to the assignee hereof and hereby expressly incorporated by reference herein for all purposes.

BACKGROUND

Aspects of the present disclosure relate generally to wireless communication systems, and more particularly, to broadcast service communications.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In wireless communication technologies such as 5G, broadcast service, such as a multicast broadcast service (MBS) or other types of broadcast services, are available to provide high throughput broadcast communications to various devices via a base station. A device may communicate with a base station in a connected mode (an RRC_CONNECTED mode as defined in the radio resource control (RRC) protocol for 5G) where the device continues to receive resources grants and associated communications with the base station. The device may communicate with the base station in an idle or inactive mode (RRC_IDLE or RRC_INACTIVE as defined in the RRC protocol for 5G) where the device can suspend power to communication resources and can periodically power on the communication resources to possibly determine to switch to the connected mode.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, a method of wireless communication by a user equipment (UE) is provided. The method includes receiving a broadcast service from one or more cells, wherein one of the one or more cells is a serving cell and at least one of the one or more cells is a non-serving cell, and transmitting, to the serving cell, a broadcast service interest indication to facilitate broadcast service continuity in mobility, wherein the broadcast service interest indication indicates to continue the broadcast service during the mobility of the UE from the serving cell to a different cell.

In another aspect, a method for wireless communications by a base station is provided. The method includes receiving, by the base station and from a UE, a broadcast service interest indication to facilitate broadcast service continuity in mobility, wherein the broadcast service interest indication indicates to continue the broadcast service during the mobility of the UE from a serving cell, provided by the base station, to a different cell, and communicating with the UE based on the broadcast service interest indication to facilitate the UE receiving the broadcast service.

In a further aspect, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

In an aspect, an apparatus for wireless communication is provided that includes a transceiver, a memory configured to store instructions, and one or more processors communicatively coupled with the memory and the transceiver. The one or more processors are configured to receive a broadcast service from one or more cells, wherein one of the one or more cells is a serving cell and at least one of the one or more cells is a non-serving cell, and transmit, to the serving cell, a broadcast service interest indication to facilitate broadcast service continuity in mobility, wherein the broadcast service interest indication indicates to continue the broadcast service during the mobility of the apparatus from the serving cell to a different cell.

In another aspect, an apparatus for wireless communication is provided that includes a transceiver, a memory configured to store instructions, and one or more processors communicatively coupled with the memory and the transceiver. The one or more processors are configured to receive, from a UE, a broadcast service interest indication to facilitate broadcast service continuity in mobility, wherein the broadcast service interest indication indicates to continue the broadcast service during the mobility of the UE from a serving cell, provided by the apparatus, to a different cell, and communicate with the UE based on the broadcast service interest indication to facilitate the UE receiving the broadcast service.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
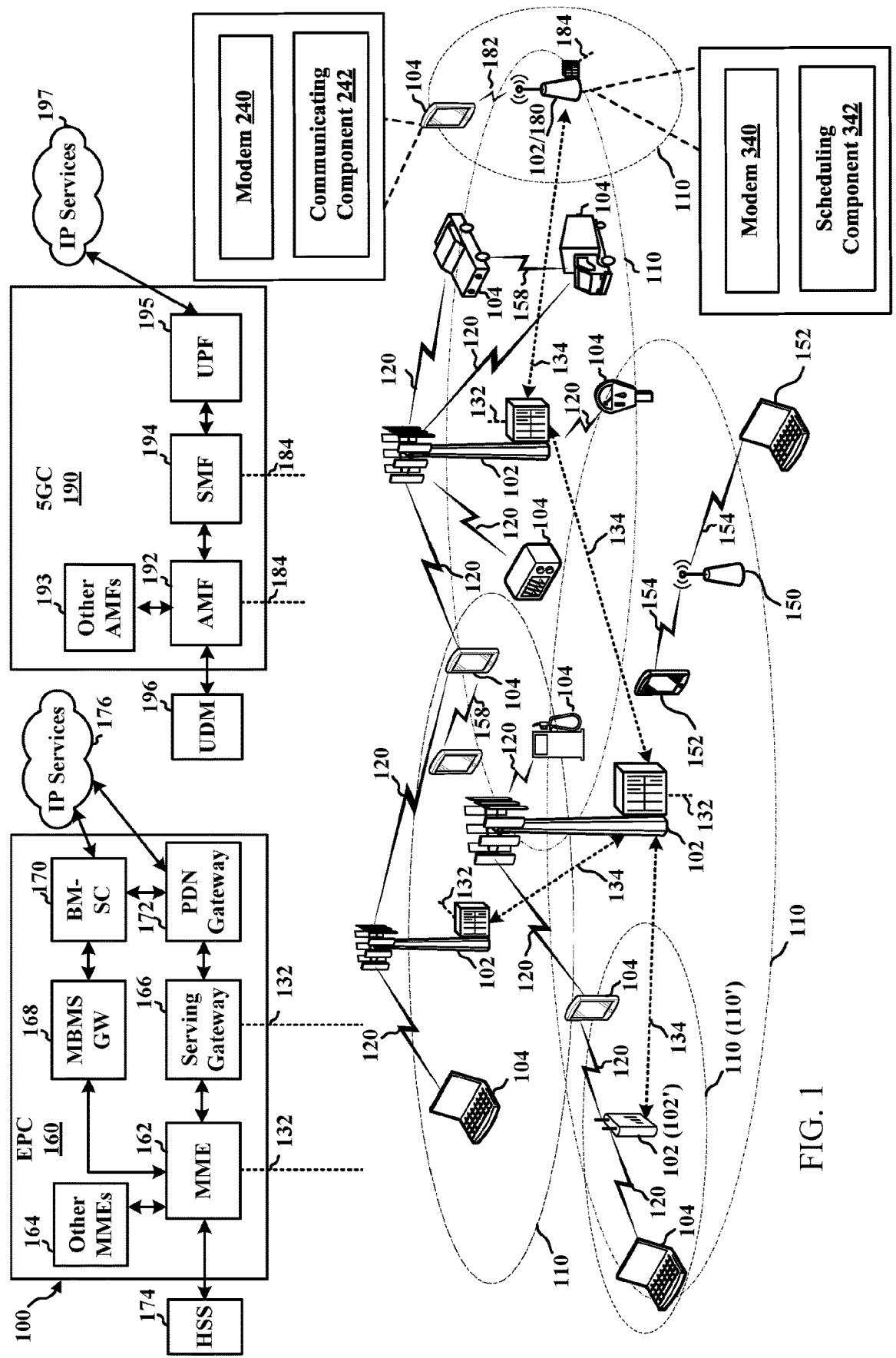
FIG. 1 illustrates an aspect of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to mechanisms for providing service continuity for broadcast services, such as multicast broadcast service (MBS) or other types of broadcast services. A device in a mobility scenario that moves communications from one cell to another can retain broadcast service communications with the next cell. In an aspect, a device (e.g., user equipment (UE)) communicating with one or more cells, where at least one of the one or more cells provides a broadcast service, can transmit a broadcast service interest indication to the one or more cells to facilitate broadcast service continuity when the device selects other cells. In an aspect, a serving cell that is providing broadcast service can use the broadcast service interest indication to determine other cells to which to potentially handover the device. In another aspect, a serving cell that does not provide the broadcast service can schedule communications with the device based on the broadcast service interest indication to allow the device to receive the broadcast service communications and communications from the serving cell.

In fourth generation (4G), enhanced multimedia broadcast multicast service (eMBMS)/single cell point to multipoint (SC-PTM) may support UE based service continuity in radio resource control (RRC)_CONNECTED state (e.g., using MBMSInterestIndication) and RRC_IDLE state. UE assisted radio access network (RAN) based lossless/seamless handover, however, can be applicable in 4G only for unicast dedicated radio bearers (DRBs) and not multicast radio bearers (MRBs). In 5G, MBS can support UE based service continuity at least for a UE receiving MBS in RRC_IDLE/INACTIVE from serving or non-serving cell, UE assisted RRC_CONNECTED state mobility for service continuity, and UE in RRC_CONNECTED being handed-over to a cell not supporting UE desired MBS. In one aspect, a MBS application of the core network can notify access stratum (AS) of the desired MBS (e.g., identified via temporary mobile group identity (TMGI), multicast broadcast (MB) flow identifier, MBS-Session identifier, etc.) for MBS-aware mobility. In one aspect, MBS service continuity can be provided while the UE is in RRC_CONNECTED state, and in another aspect, a MBS bearer can be stopped/suspended and a DRB can be established to receive the desired MBS using unicast communications. In aspects described herein, broadcast service continuity, for MBS, or other broadcast services, can be provided for a device in mobility that selects or hands-over from one cell to another. This can allow for improved experience when using the UE as the broadcast service can appear uninterrupted as the UE moves throughout a wireless network.

The described features will be presented in more detail below with reference to FIGS. 1-6.

As used in this application, the terms "component," "module," "system" and the like are intended to include a computer-related entity, such as but not limited to hardware, firmware, a combination of hardware and software, software, or software in execution. In an aspect, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an aspect of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an aspect, the base stations 102 may also include gNBs 180, as described further herein. In one aspect, some nodes of the wireless communication system may have a modem 240 and communicating component 242 for communicating with a base station 102 to receive a broadcast service, and some nodes may have a modem 340 and scheduling component 342 for scheduling devices to receive broadcast service communications, as described herein. Though a UE 104 is shown as having the modem 240 and communicating component 242 and a base station 102/gNB 180 is shown as having the modem 340 and scheduling component 342, this is one illustrative example, and substantially any node or type of node may include a modem 240 and communicating component 242 and/or a modem 340 and scheduling component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. In an aspect, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another aspect, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as in an aspect, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. In an aspect, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an aspect, scheduling component 342 can provide one or more broadcast services over certain resources, and/or can provide information regarding the resources (e.g., time and frequency resources) over which the broadcast services are provided. Communicating component 242 can receive the broadcast service from the base station 102 in a serving cell or non-serving cell provided by the base station 102. In an aspect, communicating component 242 can transmit a broadcast service interest indication to a serving base station, which may be the base station 102 providing the MBS or another base station, to facilitate broadcast service continuity in mobility. In an aspect, a serving base station that does not provide the broadcast service can schedule, based on the broadcast service interest indication, communication with the UE 104, via a scheduling component 342, to allow the UE 104 to receive the broadcast service from the other base station 102. In another aspect, a serving base station 102 that provides the broadcast service can, based on the broadcast service interest indication, consider target cells for handing over the UE 104 based on whether the target cells support the broadcast service.

Figure 2:
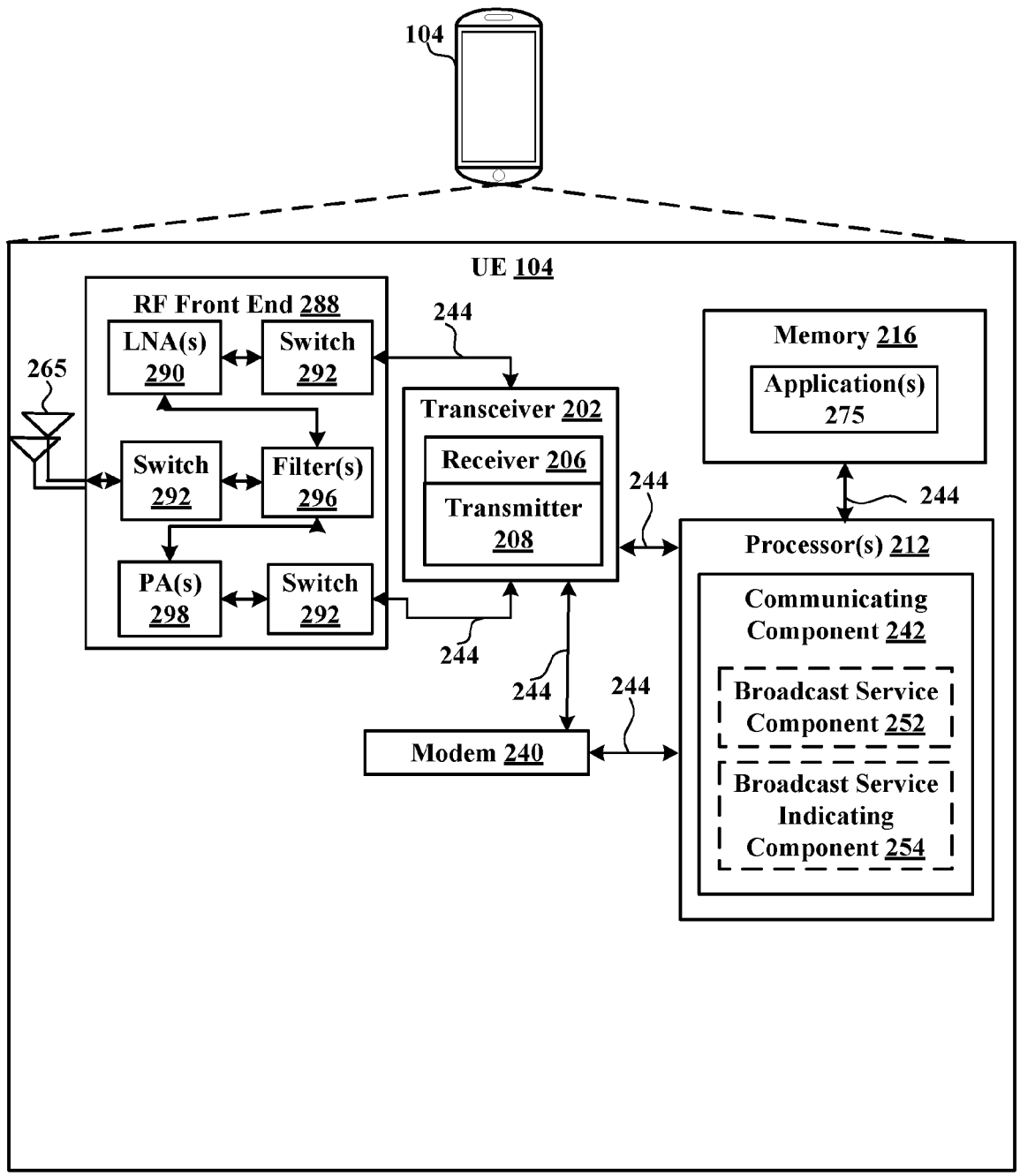
FIG. 2 is a block diagram illustrating an aspect of a UE, in accordance with various aspects of the present disclosure.
Figure 3:
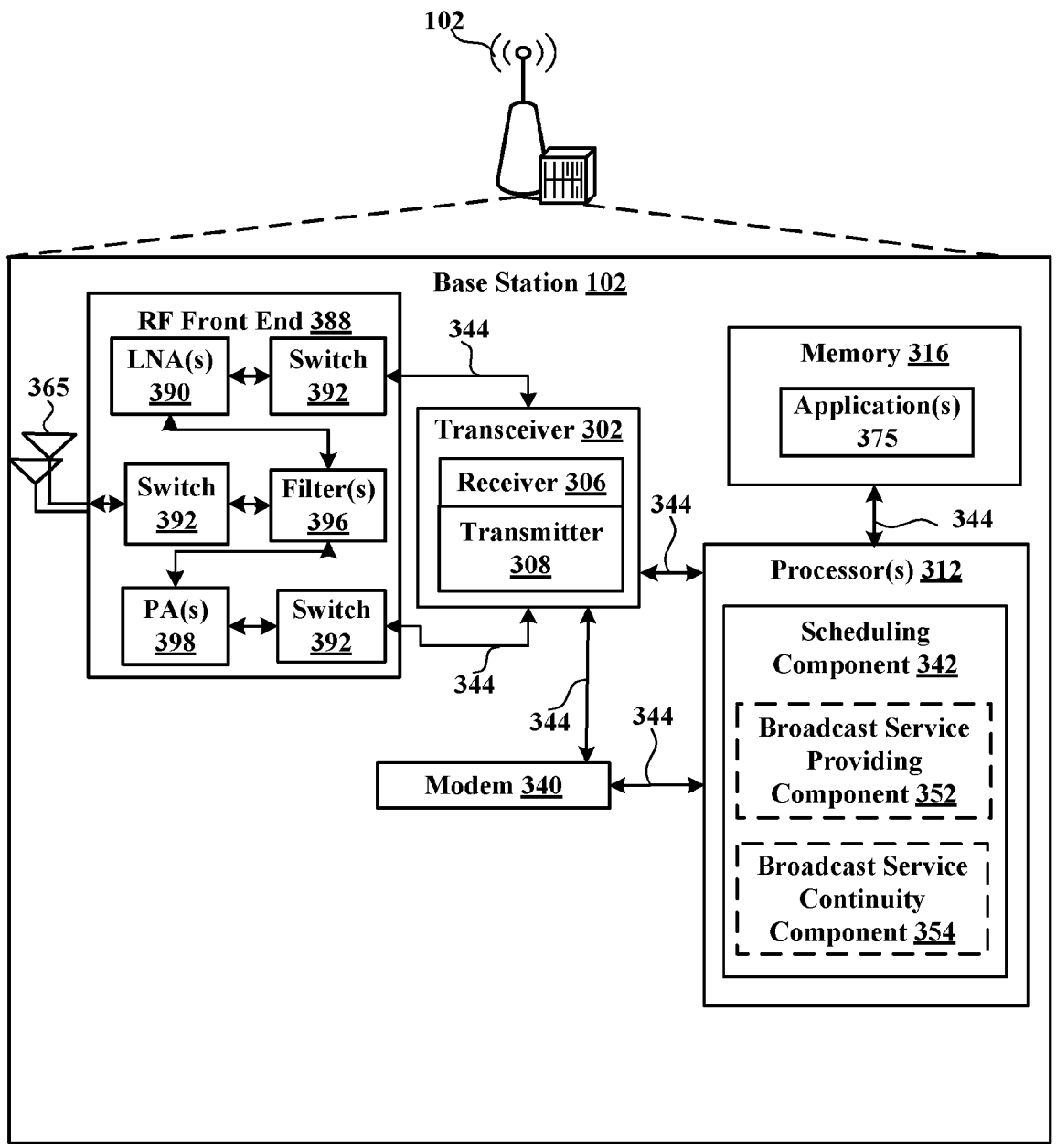
FIG. 3 is a block diagram illustrating an aspect of a base station, in accordance with various aspects of the present disclosure.
Figure 4:
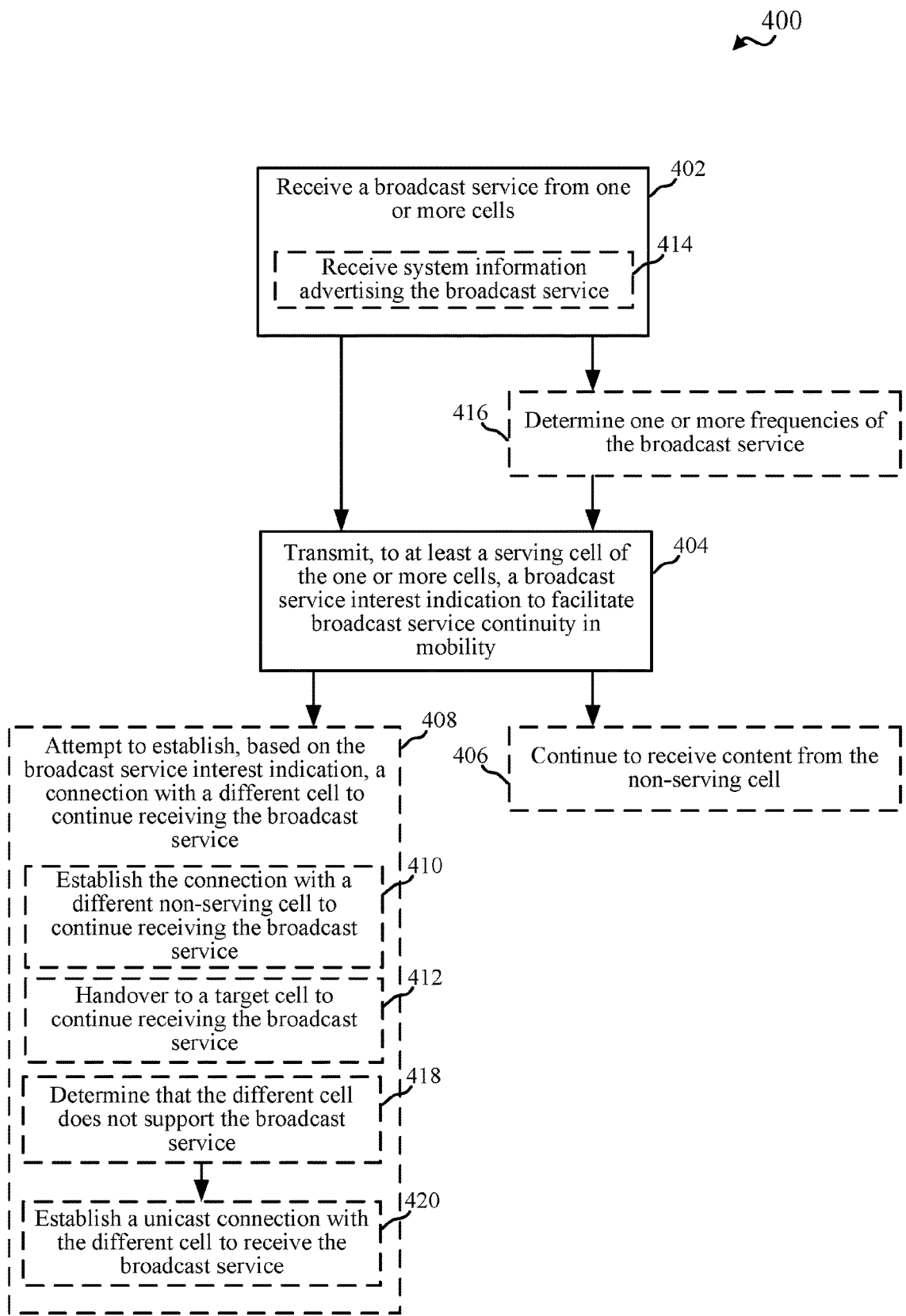
FIG. 4 is a flow chart illustrating an aspect of a method for providing broadcast service continuity in UE mobility, in accordance with various aspects of the present disclosure.
Figure 5:
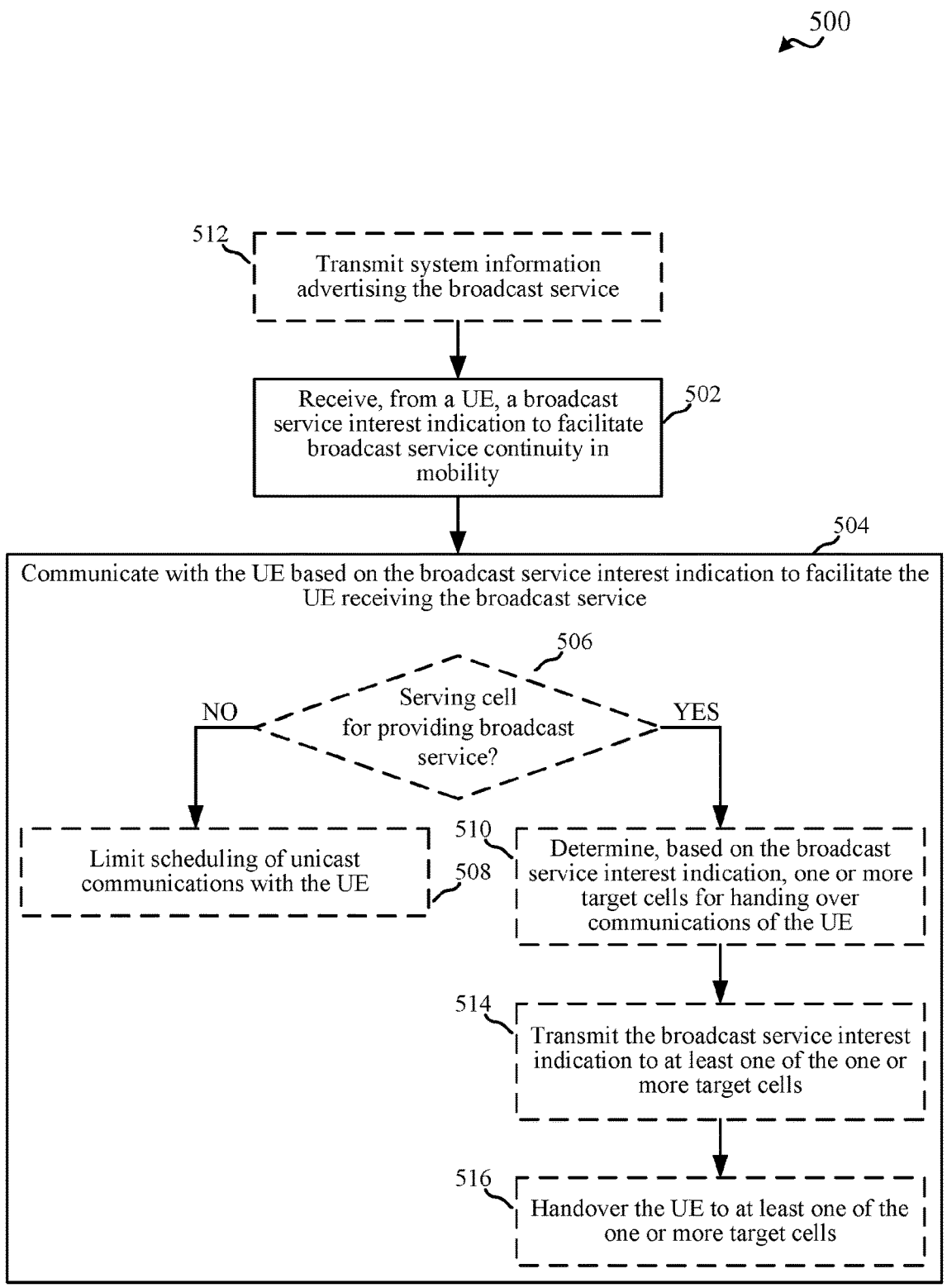
FIG. 5 is a flow chart illustrating an aspect of a method for providing broadcast services, in accordance with various aspects of the present disclosure.

Turning now to FIGS. 2-6, aspects are depicted with reference to one or more components and one or more methods that may perform the actions or operations described herein, where aspects in dashed line may be optional. Although the operations described below in FIGS. 4-5 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one aspect of an implementation of UE 104 may include a variety of components, some of which have already been described above and are described further herein, including components such as one or more processors 212 and memory 216 and transceiver 202 in a communication via one or more buses 244, which may operate in conjunction with modem 240 and/or communicating component 242 for communicating with a base station 102 to receive a broadcast service, as described further herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. In an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, in an aspect, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, in an aspect, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, in an aspect, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, in an aspect, one or more filters 296 can be used by RF front end 288 to filter a received signal to obtain an input RF signal. Similarly, in an aspect, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, in an aspect, one or more base stations 102 or one or more cells associated with one or more base stations 102. In an aspect, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a broadcast service component 252 for receiving a broadcast service from a serving cell or non-serving cell, and/or a broadcast service indicating component 254 for and transmitting a broadcast service interest indication to a serving cell to facilitate receiving the broadcast service from serving cells and/or non-serving cells in mobility scenarios, as described further herein.

In an aspect, the processor(s) 212 may correspond to one or more of the processors described in connection with the UE in FIG. 6. Similarly, the memory 216 may correspond to the memory described in connection with the UE in FIG. 6.

Referring to FIG. 3, one aspect of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and scheduling component 342 for scheduling devices to receive broadcast service communications, as described further herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, scheduling component 342 can optionally include a broadcast service providing component 352 for providing broadcast service to one or more UEs, and/or a broadcast service continuity component 354 for facilitating broadcast service continuity in mobility scenarios for the one or more UEs, as described further herein.

In an aspect, the processor(s) 312 may correspond to one or more of the processors described in connection with the base station in FIG. 6. Similarly, the memory 316 may correspond to the memory described in connection with the base station in FIG. 6.

FIG. 4 illustrates a flow chart of an aspect of a method 400 for receiving a broadcast service. In an aspect, a UE 104 can perform the functions described in method 400 using one or more of the components described in FIGS. 1-2.

In method 400, at Block 402, the UE can receive a broadcast service from one or more cells. In an aspect, broadcast service component 252, e.g., in conjunction with processor(s) 212, memory 216, transceiver 202, communicating component 242, etc., can receive the broadcast service from one or more cells. In an aspect, the one or more cells may include a serving cell and a non-serving cell where at least one of the serving cell or the non-serving cell provide the broadcast service. In an aspect, broadcast service component 252 can communicate with the serving cell and/or non-serving cell to receive the broadcast service in a connected mode (e.g., RRC_CONNECTED as defined in 5G) such that the UE 104 can continuously receive the broadcast service from the corresponding cell and/or an indication of resources over which communications for the broadcast service are transmitted by the cell. In an aspect, the serving cell and/or non-serving cell can be provided by a base station 102, as described above and further herein, and the terms cell and base station may be used interchangeably throughout this description. In one aspect, where the UE 104 is receiving the broadcast service in RRC_CONNECTED mode, the UE may expect, when being handed over to other cells, the broadcast service to continue with the new cell.

In method 400, at Block 404, the UE can transmit, to at least a serving cell of the one or more cells, a broadcast service interest indication to facilitate broadcast service continuity in mobility. In an aspect, broadcast service indicating component 254, e.g., in conjunction with processor(s) 212, memory 216, transceiver 202, communicating component 242, etc., can transmit, to at least the serving cell of the one or more cells, a broadcast service interest indication to facilitate broadcast service continuity. In an aspect, the broadcast service interest indication may be an indication that the UE 104 is interested in receiving the broadcast service, and may identify the broadcast service using one or more identifiers, such as TMGI, broadcast service flow identifier (e.g., MB-flow identifier), broadcast service session identifier (e.g., MB-session identifier), a frequency over which the broadcast service is provided, a numerology associated with the broadcast service, a bandwidth associated with the broadcast service, etc. In an aspect, broadcast service indicating component 254 can transmit the broadcast service interest indication to its serving cell (e.g., regardless of whether the serving cell is providing the broadcast service) using RRC signaling, control signaling (e.g., over granted uplink control resources), etc.

In method 400, optionally at Block 406, the UE can continue to receive content from the non-serving cell. In an aspect, broadcast service component 252, e.g., in conjunction with processor(s) 212, memory 216, transceiver 202, communicating component 242, etc., can continue to receive content (e.g., broadcast service content) from the non-serving cell (e.g., after transmitting the broadcast service interest indication to the serving cell). In an aspect, where the broadcast service component 252 receives broadcast service content from a non-serving cell, broadcast service component 252 may autonomously change the non-serving cell (e.g., select or handover to another non-serving cell to receive the broadcast service). In an aspect, broadcast service component 252 can update the serving cell (e.g., serving base station 102) by the RRC message after non-serving cell change. In addition, in an aspect, broadcast service component 252 can send the broadcast service interest indication (e.g., to the serving cell) even when system information related to the broadcast service is not received from serving cell (e.g., and thus broadcast service component 252 is not receiving the broadcast service from the serving cell). In this aspect, sending the broadcast service interest indication to the serving cell can enable the serving cell (or associated base station) to limit scheduling of unicast communications (e.g., limit unicast transport block (TB) size for communications with the serving cell) such that UE maximum communication capabilities are not exceeded by receiving the unicast communications from the serving cell along with broadcast service from the non-serving cell. In this aspect, broadcast service component 252 can indicate broadcast service interest indication as intended for non-serving cell service reception.

In method 400, optionally at Block 408, the UE can attempt to establish, based on the broadcast service interest indication, a connection with a different cell to continue receiving the broadcast service. In an aspect, broadcast service component 252, e.g., in conjunction with processor(s) 212, memory 216, transceiver 202, communicating component 242, etc., can attempt to establish, based on the broadcast service interest indication, the connection with a different cell to continue receiving the broadcast service. In an aspect, broadcast service component 252 can attempt to establish the connection with a different cell as a serving cell or non-serving cell in mobility to maintain broadcast service continuity with the different cell. In an aspect, attempting to establishing a connection with the different cell as described herein can include or can be based on the broadcast service component 252 autonomously (e.g., without direction from the serving cell) attempting to establish the connection with the different cell. In another aspect, attempting to establishing a connection with the different cell as described herein can include or can be based on the broadcast service component 252 providing information to the serving cell (e.g., signal strength or quality measurements of signals from the serving cell and/or the different cell), receiving an indication from the serving cell to attempt connection establishment with the different cell, and accordingly attempting to establishing the connection with the different cell based on the indication from the serving cell.

In an aspect, in attempting to establish the connection at Block 408, optionally at Block 410, the UE can establish the connection with a different non-serving cell to continue receiving the broadcast service. In an aspect, broadcast service component 252, e.g., in conjunction with processor(s) 212, memory 216, transceiver 202, communicating component 242, etc., can establish the connection with a different non-serving cell to continue receiving the broadcast service. As described, the UE 104 can autonomously change the non-serving cell for receiving the broadcast service, which can be based on one or more triggers, such as detecting the different cell, determining the different cell supports the broadcast service (e.g., based on system information received from the different cell), determining that a signal power or quality of signals received from the different cell achieve a threshold level and/or that a signal power or quality of the current non-serving cell from which broadcast service is received fails to achieve a threshold, etc. Moreover, in an aspect, broadcast service component 252 may notify the serving cell (e.g., via RRC message) of changing the non-serving cell.

In an aspect, in attempting to establish the connection at Block 408, optionally at Block 412, the UE can handover to a target cell to continue receiving the broadcast service. In an aspect, broadcast service component 252, e.g., in conjunction with processor(s) 212, memory 216, transceiver 202, communicating component 242, etc., can handover to the target cell to continue receiving the broadcast service. In an aspect, broadcast service component 252 can handover to the target cell based on an instruction from the serving cell. As described, in an aspect, the serving cell may receive the broadcast service interest indication from the UE 104, which may identify one or more broadcast services (e.g., MBSs) that the UE 104 is interested in receiving or maintaining continuity. Accordingly, as described above and further herein, the serving cell can evaluate target cells for handover based at least in part on determining whether the target cell(s) support the one or more (e.g., or at least one of the one or more) broadcast service. Based on one or more handover triggers (e.g., related to signal measurements reported by the UE 104), the serving cell can instruct the UE 104 to handover to the different cell, which supports the broadcast service in this aspect.

In an aspect, the serving cell can provide the broadcast service to the UE 104. In an aspect, UE 104 may receive broadcast service from serving cell. In an aspect, broadcast service indicating component 254 can transmit assistance information, which may include the broadcast service interest indication, the serving cell to try to ensure broadcast service continuity during mobility (HO) and/or overload. In an aspect, the serving cell (e.g., serving gNB PCell) can indicate in system information (e.g., SIBx) a list of frequencies, numerology (for intra and inter frequency list), supported MBS Services (TMGI/MBS service area identity (SAI)/MBS-Session ID/MB S Flow ID), etc.

In an aspect, in communicating with the one or more cells at Block 402, optionally at Block 414, the UE can receive system information advertising the broadcast service. In an aspect, broadcast service component 252, e.g., in conjunction with processor(s) 212, memory 216, transceiver 202, communicating component 242, etc., can receive the system information advertising the broadcast service. In an aspect, whether the cell providing the broadcast service is the serving cell or not, the cell can broadcast the system information (e.g., SIBx) that can identify the supported broadcast service services. In any case, in an aspect, broadcast service indicating component 254 can transmit the broadcast service interest indication (at Block 404) based on the received system information.

In one aspect, in method 400, optionally at Block 416, the UE can determine one or more frequencies of the broadcast service. In an aspect, broadcast service component 252, e.g., in conjunction with processor(s) 212, memory 216, transceiver 202, communicating component 242, etc., can determine the one or more frequencies of the broadcast service, as advertised in the system information. As described, in an aspect, the broadcast service can be transmitted in a cell over a specified frequency, and the broadcast service component 252 can accordingly determine the desired frequency for receiving the desired MBS. In an aspect, in transmitting the broadcast service interest indication at Block 404, broadcast service indicating component 254 can include the one or more frequencies in the broadcast service interest indication. In an aspect, based on broadcast service indicating component 254 determining to transmit the broadcast service interest indication (e.g., MBSInterestIndication), broadcast service component 252 can determine frequencies of broadcast service(s) are of interest based on one or more of the following conditions: at least one broadcast service session the UE is receiving or interested to receive via a radio bearer (e.g., MRB) is ongoing or about to start; SIBx acquired from the PCell includes a frequency, numerology, broadcast service Service Identifier (quality of service (QoS) Flow ID/TMGI/Session ID) with one or more broadcast services of interest by UE (based on broadcast service information stored in user service description (USD) and UE interested service); determining that the UE is capable of simultaneously receiving the set of broadcast service frequencies of interest, regardless of whether a serving cell is configured on each of these frequencies or not; and/or determining that the supported band combination indicated (e.g., by the UE 104) in NR UE capability includes at least one band combination including the set of broadcast service frequencies of interest. In an aspect, the serving gNB may take UE band combination capability and the receiving broadcast service frequency (ies) into consideration in handover and measurement configuration (e.g., in selecting the target cell to which the UE is to handover, as described above).

In one aspect, for a UE 104 interested in MBS service(s), broadcast service component 252 can send MBSInterestIndication to gNB when SIBx is received in the serving gNB PCell. Broadcast service component 252 can transmit MBS interest indication (e.g., at Block 404) when interested frequencies change (e.g., at MBS session start/stop, MBS interest change at the UE 104, etc.), when MBS priority changes at the UE 104 (e.g., based on receiving the MBS using unicast vs. using broadcast), etc., and the serving cell can use this information (e.g., as last received from the UE 104) to determine a target cell for handing over the UE 104.

In another aspect, in attempting to establish the connection at Block 408, optionally at Block 418, the UE can determine that the different cell does not support the broadcast service. In an aspect, broadcast service component 252, e.g., in conjunction with processor(s) 212, memory 216, transceiver 202, communicating component 242, etc., can determine that the different cell does not support the broadcast service. In an aspect, this may include determining that the different cell does not support a radio bearer (e.g., MRB) over which the broadcast service communications can be transmitted by a cell, that the different cell does not support one or more frequencies, numerology, bandwidth, etc. associated with the broadcast service, etc. In one aspect, the different cell may be out of broadcast service coverage, or the network may not support MB S-aware mobility.

In this aspect, optionally at Block 420, the UE may establish a unicast connection with the different cell to receive the broadcast service. In an aspect, broadcast service component 252, e.g., in conjunction with processor(s) 212, memory 216, transceiver 202, communicating component 242, etc., can establish the unicast connection with the different cell to receive the broadcast service to facilitate broadcast service continuity. In an aspect, broadcast service component 252 can transmit a UE AS indication to upper layers to establish the unicast connection with an application server that provides the broadcast service via the different cell. In an aspect, before the unicast connection is made to the application server, broadcast service component 252 may request the broadcast service by NAS (e.g., service request) based on the desired TMGI, broadcast service flow ID, broadcast service Session ID, etc. of the broadcast service. In an aspect, broadcast service component 252 can establish the unicast connection with the different cell based on determining that the different cell does not support the broadcast service.

In this aspect, broadcast service component 252 can perform a broadcast service bearer stop/suspend and establish DRB to receive UE interested service in unicast manner. In an aspect, gNB can handover the UE to a cell without UE desired TMGI/MB-flow/MB-Session ID. In another aspect, the gNB can decide to suspend/stop the TMGI/MB-flow/MB-Session ID, as described herein. In addition, in this aspect, an AS layer can notify the application providing the MBS (e.g., UE's 104 application layer signaling to an application server) that the TMGI/MB-flow/MB-Session ID is (being) suspended/stopped. The application executing on the UE 104 can then request the NAS layer to establish unicast connection to the application server via the unicast connection, and broadcast service component 252 can accordingly attempt to establish the unicast connection to the different cell to continue AS layer communications with the application server.

In any case, in the aspects described above, broadcast service component 252 can attempt to continue the MBS with the different cell, whether by selecting the different cell as a non-serving cell for providing the MBS, handing over to the different cell as a new serving cell for providing the MBS, establishing the unicast connection to receive the MBS where the cell does not support the MBS, etc. In an aspect, broadcast service component 252 can determine to continue the broadcast service (e.g., MBS) using one or more of these mechanisms based on determining that the UE 104 transmitted the broadcast service interest indication to the serving cell (e.g., to base station 102). In another aspect, broadcast service component 252 can determine to continue the broadcast service (e.g., MBS) using one or more of these mechanisms based on receiving an indication or other information from the service cell (e.g., base station 102) to continue the broadcast service, which may be based on the UE 104 transmitting the broadcast service interest indication to the serving cell.

FIG. 5 illustrates a flow chart of an aspect of a method 500 for providing broadcast service continuity in UE mobility scenarios. In an aspect, a base station 102 can perform the functions described in method 400 using one or more of the components described in FIG. 1 or 3. In an aspect, broadcast service providing component 352, e.g., in conjunction with processor(s) 312, memory 316, transceiver 302, scheduling component 342, etc., can provide communications related to an MBS to one or more UEs.

In method 500, at Block 502, the base station 102 can receive, from a UE (e.g., UE 104), a broadcast service interest indication to facilitate broadcast service continuity in mobility. In an aspect, broadcast service providing component 352, e.g., in conjunction with processor(s) 312, memory 316, transceiver 302, scheduling component 342, etc., can receive, from the UE, the broadcast service interest indication to facilitate the broadcast service continuity in mobility. In an aspect, broadcast service providing component 352 can receive the broadcast service interest indication in RRC signaling from the UE 104 (e.g., in dedicated RRC signaling). In an aspect, as described, the received broadcast service interest indication may be an indication that the UE 104 is interested in receiving the broadcast service, and may identify the broadcast service using one or more identifiers, such as TMGI, broadcast service flow identifier, broadcast service session identifier, a frequency over which the broadcast service is provided, a numerology associated with the broadcast service, a bandwidth associated with the broadcast service, etc.

As described, in an aspect, the base station 102 may provide a serving cell for the UE 104 and may or may not provide the broadcast service, which can result in different functionality at the base station 102 based on receiving the broadcast service interest indication. In any case, in method 500, at Block 504, the base station 102 can communicate with the UE (e.g., UE 104) based on the broadcast service interest indication to facilitate the UE receiving the broadcast service. In an aspect, broadcast service providing component 352, e.g., in conjunction with processor(s) 312, memory 316, transceiver 302, scheduling component 342, etc., can communicate with the UE based on the broadcast service interest indication to facilitate the UE receiving the broadcast service (e.g., even during mobility of the UE among cells provided by the same or different base stations). This may include communicating with the UE to continue providing the broadcast service, where the serving cell provides the broadcast service, handing over the UE to continue the broadcast service, where the serving cell provides the broadcast service, limiting scheduling of unicast communications to the UE where the serving cell does not provide the broadcast service, etc.

In an aspect, where the serving cell is not for providing broadcast service at Block 506, optionally at Block 508, the base station 102 can limit scheduling of unicast communications with the UE. In an aspect, scheduling component 342, e.g., in conjunction with processor(s) 312, memory 316, transceiver 302, etc., can limit scheduling of unicast communications with the UE 104. In an aspect, this can allow the UE to additionally receive the broadcast service from a non-serving cell without exceeding maximum capabilities at the UE for receiving communications. In an aspect, scheduling component 342, in this aspect, can determine to limit scheduling of unicast transport block size to ensure maximum UE capabilities are not exceeded. In an aspect, scheduling component 342 can determine to limit the scheduling of unicast communications based on determining that the serving cell is not providing the broadcast service and/or based on determining that one or more other cells are providing broadcast service to the UE 104.

In an aspect, where the serving cell is for providing broadcast service at Block 506, optionally at Block 510, the base station 102 can determine, based on the broadcast service interest indication, one or more target cells for handing over communications of the UE. In an aspect, broadcast service continuity component 354, e.g., in conjunction with processor(s) 312, memory 316, transceiver 302, scheduling component 342, etc., can determine, based on the broadcast service interest indication, one or more target cells for handing over communications of the UE. In an aspect, broadcast service continuity component 354 can determine the broadcast service desired to be received and/or continued by the UE 104 based on the broadcast service interest indication (e.g., based on an identifier of the broadcast service, frequencies associated with the broadcast service, numerology, bandwidth, etc., which can be indicated in the broadcast service interest indication. In an aspect, broadcast service continuity component 354 can accordingly determine one or more target cells that the provide the broadcast service desired by the UE 104, and can determine at least one of the one or more target cells for handing over the UE 104.

In an aspect, broadcast service continuity component 354 can determine an initial list of target cells based on a measurement report received from the UE 104 of potential cells for handover (e.g., cells having at least a threshold measurement). The broadcast service continuity component 354 can then determine at least one of the potential cells that provide the broadcast service (e.g., a cell having the highest reported signal strength or quality, among one or more other cells, that is also capable of providing the broadcast service), and can select the at least one potential cell as a target cell to receive handover of the UE 104. In addition, in an aspect, this may be based on other triggers that may be related to measurements in the measurement report, such as signal strength/quality of the target cell(s) achieving a threshold, signal strength/quality of the current serving cell failing to achieve a threshold, etc.

In addition, as described, the UE 104 can transmit the broadcast service interest indication as assistance information for the base station 102 to try to ensure broadcast service continuity during mobility (HO) and/or overload. In addition, where the serving cell is providing the broadcast service, optionally at Block 512, the base station 102 can transmit system information advertising the broadcast service. In an aspect, broadcast service providing component 352, e.g., in conjunction with processor(s) 312, memory 316, transceiver 302, scheduling component 342, etc., can transmit the system information advertising the broadcast service, and/or may receive the broadcast service interest indication from the UE 104 in response to, or otherwise based on, the system information, as described above. In an aspect, the base station 102 (e.g., providing the serving gNB PCell) can indicate in SIBx, a list of frequencies, Numerology (for intra and inter frequency list) and supported MBS Services (TMGI/MBS SAT/MBS-Session ID/MBS Flow ID), etc. The UE 104 interested in broadcast service service(s) can send the broadcast service interest indication (e.g., the MBSInterestIndication) to gNB when SIBx is received in the serving gNB PCell.

In addition, where the serving cell provides the broadcast service in this aspect, optionally at Block 514, the base station 102 can transmit the broadcast service interest indication to at least one of the one or more target cells. In an aspect, broadcast service continuity component 354, e.g., in conjunction with processor(s) 312, memory 316, transceiver 302, scheduling component 342, etc., can transmit the broadcast service interest indication, as received from the UE 104 (e.g., at Block 502) to the at least one of the one or more target cells. In an aspect, broadcast service continuity component 354 can transmit the broadcast service interest indication as part of UE context transfer so the target cell can have the broadcast service information for the UE 104 such to facilitate at least one of providing the broadcast service thereto or determining another target cell for the UE 104 in UE mobility context.

In any case, where at least one target cell is identified, optionally at Block 516, the base station 102 can handover the UE to at least one of the one or more target cells. In an aspect, scheduling component 342, e.g., in conjunction with processor(s) 312, memory 316, transceiver 302, etc., can handover the UE to at least one of the one or more target cells. In an aspect, this can include preparing at least one target cell with UE context information (e.g., including broadcast service interest indication), as described, and commanding the UE 104 to establish communications with the target cell, etc. In this regard, broadcast service continuity can be provided from the serving cell to the target cell in handover.

Figure 6:
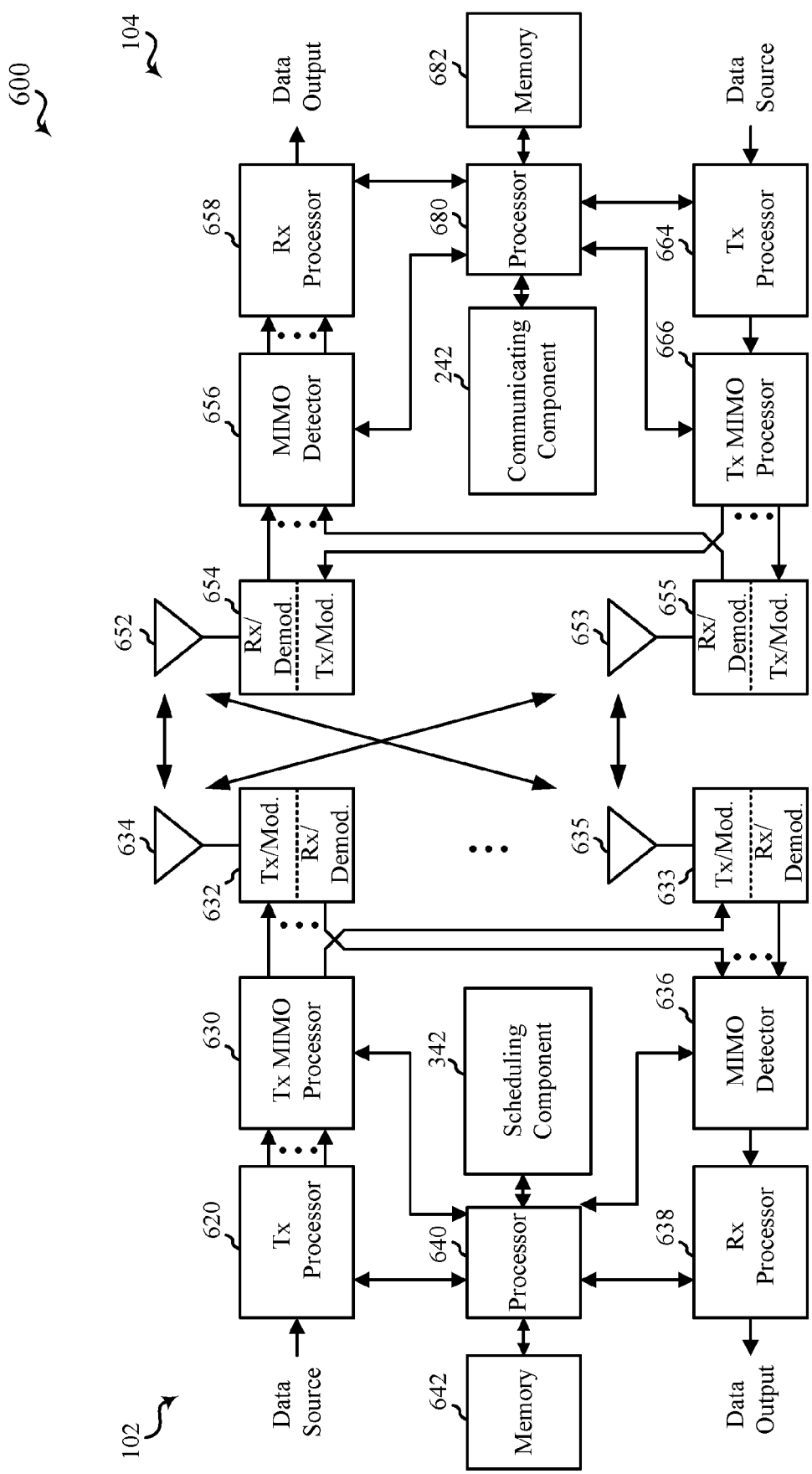
FIG. 6 is a block diagram illustrating an aspect of a MIMO communication system including a base station and a UE, in accordance with various aspects of the present disclosure.

FIG. 6 is a block diagram of a MIMO communication system 600 including a base station 102 and a UE 104. The MIMO communication system 600 may illustrate aspects of the wireless communication access network 100 described with reference to FIG. 1. The base station 102 may be an example of aspects of the base station 102 described with reference to FIG. 1. The base station 102 may be equipped with antennas 634 and 635, and the UE 104 may be equipped with antennas 652 and 653. In the MIMO communication system 600, the base station 102 may be able to send data over multiple communication links at the same time. Each communication link may be called a "layer" and the "rank" of the communication link may indicate the number of layers used for communication. In an aspect, in a 2×2 MIMO communication system where base station 102 transmits two "layers," the rank of the communication link between the base station 102 and the UE 104 is two.

At the base station 102, a transmit (Tx) processor 620 may receive data from a data source. The transmit processor 620 may process the data. The transmit processor 620 may also generate control symbols or reference symbols. A transmit MIMO processor 630 may perform spatial processing (e.g., precoding) on data symbols, control symbols, or reference symbols, if applicable, and may provide output symbol streams to the transmit modulator/demodulators 632 and 633. Each modulator/demodulator 632 through 633 may process a respective output symbol stream (e.g., for OFDM, etc.) to obtain an output sample stream. Each modulator/demodulator 632 through 633 may further process (e.g., convert to analog, amplify, filter, and upconvert) the output sample stream to obtain a DL signal. In one aspect, DL signals from modulator/demodulators 632 and 633 may be transmitted via the antennas 634 and 635, respectively.

The UE 104 may be an example of aspects of the UEs 104 described with reference to FIGS. 1-2. At the UE 104, the UE antennas 652 and 653 may receive the DL signals from the base station 102 and may provide the received signals to the modulator/demodulators 654 and 655, respectively. Each modulator/demodulator 654 through 655 may condition (e.g., filter, amplify, downconvert, and digitize) a respective received signal to obtain input samples. Each modulator/demodulator 654 through 655 may further process the input samples (e.g., for OFDM, etc.) to obtain received symbols. A MIMO detector 656 may obtain received symbols from the modulator/demodulators 654 and 655, perform MIMO detection on the received symbols, if applicable, and provide detected symbols. A receive (Rx) processor 658 may process (e.g., demodulate, deinterleave, and decode) the detected symbols, providing decoded data for the UE 104 to a data output, and provide decoded control information to a processor 680, or memory 682.

The processor 680 may in some cases execute stored instructions to instantiate a communicating component 242 (see e.g., FIGS. 1 and 2).

On the uplink (UL), at the UE 104, a transmit processor 664 may receive and process data from a data source. The transmit processor 664 may also generate reference symbols for a reference signal. The symbols from the transmit processor 664 may be precoded by a transmit MIMO processor 666 if applicable, further processed by the modulator/demodulators 654 and 655 (e.g., for SC-FDMA, etc.), and be transmitted to the base station 102 in accordance with the communication parameters received from the base station 102. At the base station 102, the UL signals from the UE 104 may be received by the antennas 634 and 635, processed by the modulator/demodulators 632 and 633, detected by a MIMO detector 636 if applicable, and further processed by a receive processor 638. The receive processor 638 may provide decoded data to a data output and to the processor 640 or memory 642.

The processor 640 may in some cases execute stored instructions to instantiate a scheduling component 342 (see e.g., FIGS. 1 and 3).

The components of the UE 104 may, individually or collectively, be implemented with one or more application specific integrated circuits (ASICs) adapted to perform some or all of the applicable functions in hardware. Each of the noted modules may be a means for performing one or more functions related to operation of the MIMO communication system 600. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 600.

The following aspects are illustrative only and aspects thereof may be combined with aspects of other embodiments or teaching described herein, without limitation.

Aspect 1 is a method for wireless communication including communicating with one or more cells for receiving a multicast broadcast service (MBS), wherein one of the one or more cells is a serving cell and at least one of the one or more cells is a non-serving cell, transmitting, to the serving cell, a MBS interest indication to facilitate MBS continuity in mobility; and one of attempting to establish, based on the MBS interest indication, a connection with a different cell to continue receiving the MBS, or continuing to receive, based on the MBS interest indication, content from the non-serving cell.

In Aspect 2, the method of Aspect 1 includes wherein the MBS interest indication includes at least one of a TMGI ID, IMB-flow ID, MB-Session ID, MBS frequency, numerology, bandwidth supported for the MBS, or any combination thereof.

In Aspect 3, the method of any of Aspects 1 or 2 includes wherein the MBS is received from the non-serving cell, and wherein attempting to establish the connection with the different cell comprises establishing the connection with a different non-serving cell to continue receiving the MBS.

In Aspect 4, the method of Aspect 3 includes wherein transmitting the MBS interest indication comprises transmitting the MBS interest indication to the serving cell, wherein the MBS and system information advertising the MBS is not received from the serving cell.

In Aspect 5, the method of any of Aspects 1 to 4 includes receiving, from the serving cell, system information advertising the MBS, wherein transmitting the MBS interest indication comprises transmitting the MBS interest indication to the serving cell based at least in part on receiving the system information.

In Aspect 6, the method of Aspect 5 includes wherein the system information indicates at least one of a list of frequencies, numerology, one or more identifiers of supported MBS services, or any combination thereof.

In Aspect 7, the method of any of Aspects 5 or 6 includes wherein transmitting the MBS interest indication is further based at least in part on detecting a change in interested frequencies for receiving MBS, detecting a MBS session start or stop, detecting a change in interest in receiving the MBS service, or detecting a change in MBS priority.

In Aspect 8, the method of any of Aspects 5 to 7 include wherein attempting to establish the connection with the different cell comprises handing over to a target cell to continue receiving the MBS.

In Aspect 9, the method of any of Aspects 1 to 8 include wherein the MBS interest indication includes one or more frequencies of the MBS, and further comprising determining the one or more frequencies of the MBS based on at least one of determining that at least one MBS session of interest is starting or has started, that system information receiving from a serving cell includes parameters of at least one MBS session of interest, determining a capability of concurrently receiving a set of MBS frequencies, or determining a supported band combination includes at least one band combination of a MBS session of interest.

In Aspect 10, the method of any of Aspects 1 to 9 include wherein attempting to establish the connection with the different cell comprises determining that the different cell does not support the MBS, and establishing a unicast connection with an application server via the different cell to receive the MBS via the different cell.

In Aspect 11, the method of Aspect 10 includes determining that the different cell does not support the MBS is based on requesting the MBS using a non-access stratum request via the different cell.

Aspect 12 is a method for wireless communication including receiving, by a base station and from the UE, a MBS interest indication to facilitate MBS continuity in mobility, and communicating with the UE based on the MBS interest indication to facilitate the UE receiving the MBS, wherein communicating with the UE comprises, where the base station provides the MBS to the UE, determining, based on the MBS interest indication, one or more target cells for handing over communications of the UE to allow the UE to continue to receive the MBS, or where the base station does not provide the MBS to the UE, limiting scheduling of unicast communications with the UE to allow the UE to receive the MBS from a non-serving cell.

In Aspect 13, the method of Aspect 12 includes wherein the MBS interest indication includes at least one of a TMGI ID, IMB-flow ID, MB-Session ID, MBS frequency, numerology, or bandwidth supported for the MBS.

In Aspect 14, the method of any of Aspects 12 or 13 include where the base station provides the MBS to the UE, transmitting system information advertising the MBS, wherein receiving the MBS interest indication comprises is based at least in part on transmitting the system information.

In Aspect 15, the method of Aspect 14 includes wherein the system information indicates at least one of a list of frequencies, numerology, or one or more identifiers of supported MBS services.

In Aspect 16, the method of any of Aspects 12 to 15 include wherein determining the target cell comprises determining that the target cell supports a frequency associated with the MBS.

In Aspect 17, the method of Aspect 16 includes, where the base station provides the MBS to the UE, transmitting, to at least one of the one or more target cells, the MB S interest indication received from the UE.

In Aspect 18, the method of Aspect 17 includes, where the base station provides the MBS to the UE, handing over the UE to the one or more target cells.

Aspect 19 is an apparatus for wireless communication including a transceiver, a memory configured to store instructions, and one or more processors communicatively coupled with the memory and the transceiver, wherein the one or more processors are configured to perform one or more of the methods of any of Aspects 1 to 18.

Aspect 20 is an apparatus for wireless communication including means for performing one or more of the methods of any of Aspects 1 to 18.

Aspect 21 is a computer-readable medium including code executable by one or more processors for wireless communications, the code including code for performing one or more of the methods of any of Aspects 1 to 18.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. In an aspect, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. In an aspect, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, in an aspect, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. In an aspect, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communication by a user equipment (UE), comprising:
receiving a broadcast service from one or more cells, wherein one of the one or more cells is a serving cell and at least one of the one or more cells is a non-serving cell; and
transmitting, to the serving cell, a broadcast service interest indication to facilitate broadcast service continuity in mobility, wherein the broadcast service interest indication indicates to continue the broadcast service during the mobility of the UE from the serving cell to a different cell.

2. The method of claim 1, further comprising, to maintain the continuity during the mobility, attempting to establish, based on the broadcast service interest indication, a connection with a different cell to continue receiving the broadcast service.

3. The method of claim 2, wherein the broadcast service is received from the non-serving cell, and wherein attempting to establish the connection with the different cell comprises establishing the connection with a different non-serving cell to continue receiving the broadcast service.

4. The method of claim 3, wherein transmitting the broadcast service interest indication comprises transmitting the broadcast service interest indication to the serving cell, wherein the broadcast service and system information advertising the broadcast service are not received from the serving cell.

5. The method of claim 2, wherein attempting to establish the connection with the different cell comprises:
determining that the different cell does not support the broadcast service; and
establishing a unicast connection with an application server via the different cell to receive the broadcast service via the different cell.

6. The method of claim 5, wherein determining that the different cell does not support the broadcast service is based on requesting the broadcast service using a non-access stratum request via the different cell.

7. The method of claim 1, further comprising, to maintain the continuity during the mobility, continuing to receive, based on the broadcast service interest indication, content from the non-serving cell.

8. The method of claim 1, wherein the broadcast service interest indication includes at least one of a temporary mobile group identity (TMGI), broadcast service flow identifier, broadcast service session identifier, broadcast service frequency, numerology, bandwidth supported for the broadcast service, or any combination thereof.

9. The method of claim 1, further comprising receiving, from the serving cell, system information advertising the broadcast service, wherein transmitting the broadcast service interest indication comprises transmitting the broadcast service interest indication to the serving cell based at least in part on receiving the system information.

10. The method of claim 9, wherein the system information indicates at least one of a list of frequencies, numerology, one or more identifiers of supported broadcast service services, or any combination thereof.

11. The method of claim 9, wherein transmitting the broadcast service interest indication is further based at least in part on detecting a change in interested frequencies for receiving broadcast service, detecting a broadcast service session start or stop, detecting a change in interest in receiving the broadcast service, or detecting a change in broadcast service priority.

12. The method of claim 9, further comprising, to maintain the continuity during the mobility and based on transmitting the broadcast service interest indication to the serving cell, handing over to a target cell to continue receiving the broadcast service.

13. The method of claim 1, wherein the broadcast service interest indication includes one or more frequencies of the broadcast service, and further comprising determining the one or more frequencies of the broadcast service based on at least one of determining that at least one broadcast service session of interest is starting or has started, that system information receiving from a serving cell includes parameters of at least one broadcast service session of interest, determining a capability of concurrently receiving a set of broadcast service frequencies, or determining a supported band combination includes at least one band combination of a broadcast service session of interest.

14. A method for wireless communication by a base station, comprising:
receiving, by the base station and from a user equipment (UE), a broadcast service interest indication to facilitate broadcast service continuity in mobility, wherein the broadcast service interest indication indicates to continue the broadcast service during the mobility of the UE from a serving cell, provided by the base station, to a different cell; and
communicating with the UE based on the broadcast service interest indication to facilitate the UE receiving the broadcast service.

15. The method of claim 14, wherein communicating with the UE includes, to maintain the continuity during mobility of the UE and where the base station provides the broadcast service to the UE, determining, based on the broadcast service interest indication, one or more target cells for handing over communications of the UE to allow the UE to continue to receive the broadcast service.

16. The method of claim 15, wherein determining the one or more target cells comprises determining that the one or more target cells support a frequency associated with the broadcast service.

17. The method of claim 16, where the base station provides the broadcast service to the UE, further comprising transmitting, to at least one of the one or more target cells, the broadcast service interest indication received from the UE.

18. The method of claim 17, where the base station provides the broadcast service to the UE, further comprising handing over the UE to the one or more target cells.

19. The method of claim 14, wherein communicating with the UE includes, to maintain the continuity during mobility of the UE and where the base station does not provide the broadcast service to the UE, limiting scheduling of unicast communications with the UE to allow the UE to receive the broadcast service from a non-serving cell.

20. The method of claim 14, wherein the broadcast service interest indication includes at least one of a temporary mobile group identity (TMGI) ID, broadcast service flow ID, broadcast service Session ID, broadcast service frequency, numerology, or bandwidth supported for the broadcast service.

21. The method of claim 14, further comprising, where the base station provides the broadcast service to the UE, transmitting system information advertising the broadcast service, wherein receiving the broadcast service interest indication is based at least in part on transmitting the system information.

22. The method of claim 21, wherein the system information indicates at least one of a list of frequencies, numerology, or one or more identifiers of supported broadcast service.

23. An apparatus for wireless communication, comprising:
a transceiver;
a memory configured to store instructions; and
one or more processors communicatively coupled with the memory and the transceiver, wherein the one or more processors are configured to:
receive a broadcast service from one or more cells, wherein one of the one or more cells is a serving cell and at least one of the one or more cells is a non-serving cell; and
transmit, to the serving cell, a broadcast service interest indication to facilitate broadcast service continuity in mobility, wherein the broadcast service interest indication indicates to continue the broadcast service during the mobility of the apparatus from the serving cell to a different cell.

24. The apparatus of claim 23, wherein the one or more processors are further configured to, to maintain the continuity during the mobility, attempt to establish, based on the broadcast service interest indication, a connection with a different cell to continue receiving the broadcast service.

25. The apparatus of claim 24, wherein the broadcast service is received from the non-serving cell, and wherein the one or more processors are configured to attempt to establish the connection with the different cell at least in part by establishing the connection with a different non-serving cell to continue receiving the broadcast service.

26. The apparatus of claim 25, wherein the one or more processors are configured to transmit the broadcast service interest indication to the serving cell, wherein the broadcast service and system information advertising the broadcast service are not received from the serving cell.

27. The apparatus of claim 24, wherein the one or more processors are configured to attempt to establish the connection with the different cell at least in part by:
determining that the different cell does not support the broadcast service; and
establishing a unicast connection with an application server via the different cell to receive the broadcast service via the different cell.

28. An apparatus for wireless communication, comprising:
a transceiver;
a memory configured to store instructions; and
one or more processors communicatively coupled with the memory and the transceiver, wherein the one or more processors are configured to:
receive, from a user equipment (UE), a broadcast service interest indication to facilitate broadcast service continuity in mobility, wherein the broadcast service interest indication indicates to continue the broadcast service during the mobility of the UE from a serving cell, provided by the apparatus, to a different cell; and
communicate with the UE based on the broadcast service interest indication to facilitate the UE receiving the broadcast service.

29. The apparatus of claim 28, wherein the one or more processors are configured to communicate with the UE at least in part by, to maintain the continuity during mobility of the UE and where the apparatus provides the broadcast service to the UE, determining, based on the broadcast service interest indication, one or more target cells for handing over communications of the UE to allow the UE to continue to receive the broadcast service.

30. The apparatus of claim 28, wherein the one or more processors are configured to communicate with the UE at least in part by, to maintain the continuity during mobility of the UE and where the apparatus does not provide the broadcast service to the UE, limiting scheduling of unicast communications with the UE to allow the UE to receive the broadcast service from a non-serving cell.

* * * * *